US009772652B2

(12) United States Patent
Lambert et al.

(10) Patent No.: US 9,772,652 B2
(45) Date of Patent: Sep. 26, 2017

(54) SYSTEMS AND METHODS FOR DISTRIBUTING AND SYNCHRONIZING REAL-TIME CLOCK

(71) Applicant: Dell Products L.P., Round Rock, TX (US)

(72) Inventors: Timothy M. Lambert, Austin, TX (US); Bhavesh Govindbhai Patel, Austin, TX (US); Mukund P. Khatri, Austin, TX (US)

(73) Assignee: DELL PRODUCTS L.P., Round Rock, TX (US)

( * ) Notice: Subject to any disclaimer, the term of this patent is extended or adjusted under 35 U.S.C. 154(b) by 208 days.

(21) Appl. No.: 14/628,796

(22) Filed: Feb. 23, 2015

(65) Prior Publication Data

US 2016/0248852 A1   Aug. 25, 2016

(51) Int. Cl.
| G06F 15/16 | (2006.01) |
| G06F 1/14 | (2006.01) |
| G06F 1/04 | (2006.01) |
| G06F 1/12 | (2006.01) |
| H04L 29/08 | (2006.01) |

(52) U.S. Cl.
CPC ............... *G06F 1/14* (2013.01); *G06F 1/04* (2013.01); *G06F 1/12* (2013.01); *H04L 67/1097* (2013.01)

(58) Field of Classification Search
CPC .... G04G 5/00; G06F 1/14; G06F 1/12; G06F 1/04; H04L 67/1097
See application file for complete search history.

(56) References Cited

U.S. PATENT DOCUMENTS

| 5,983,304 A * | 11/1999 | Jin ...................... G06F 13/4059 710/100 |
| 8,489,775 B2 * | 7/2013 | Berke ...................... G06F 1/12 370/338 |
| 2013/0024716 A1 * | 1/2013 | Hadley .................. G06F 21/54 713/600 |

* cited by examiner

*Primary Examiner* — Krisna Lim
(74) *Attorney, Agent, or Firm* — Jackson Walker L.L.P.

(57) ABSTRACT

In accordance with embodiments of the present disclosure, an information handling system may include a processor, an access controller, a real-time clock, and a basic input/output system. The access controller may be communicatively coupled to the processor and configured to execute a client for retrieving real time via a network communicatively coupled to the access controller. The real-time clock may be communicatively coupled to the access controller. The basic input/output system may be embodied in one or more instructions readable and executable by the processor and configured to, during a power-on/self-test of the basic input/output system, read real time from the access controller and write the real time to the real-time clock.

18 Claims, 2 Drawing Sheets

SYSTEMS AND METHODS FOR DISTRIBUTING AND SYNCHRONIZING REAL-TIME CLOCK

TECHNICAL FIELD

The present disclosure relates in general to information handling systems, and more particularly to distributing and synchronizing a real-time clock in an information handling system or in a modular system comprising a plurality of information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems and other electronic devices often include an integrated circuit known as a real-time clock (RTC) to maintain accurate track of a current time. However, in a system utilizing a chassis with multiple modular information handling systems with various peripheral and I/O capabilities common to the chassis as a whole, real-time management among components, basic input/output systems (BIOS) of individual information handling systems, access controllers of individual information handling systems, and chassis-level components such as a chassis management controller, presents many difficulties. In addition, due to evolution of functionality, BIOSes often no longer require battery backup, often leaving a real-time clock as the only component of an information handling system requiring a battery, often in the form of a coin-cell battery, which affects cost and servicing of information handling systems.

SUMMARY

In accordance with the teachings of the present disclosure, the disadvantages and problems associated with distributing and synchronizing a real-time clock may be reduced or eliminated.

In accordance with embodiments of the present disclosure, an information handling system may include a processor, an access controller, a real-time clock, and a basic input/output system. The access controller may be communicatively coupled to the processor and configured to execute a client for retrieving real time via a network communicatively coupled to the access controller. The real-time clock may be communicatively coupled to the access controller. The basic input/output system may be embodied in one or more instructions readable and executable by the processor and configured to, during a power-on/self-test of the basic input/output system, read real time from the access controller and write the real time to the real-time clock.

In accordance with these and other embodiments of the present disclosure, a method may include executing, by an access controller of an information handling system, a client for retrieving real time via a network communicatively coupled to the access controller. The method may also include, during a power-on/self-test of a basic input/output system embodied in one or more instructions readable and executable by a processor, reading real time from the access controller and writing the real time to a real-time clock communicatively coupled to the processor, the basic input/output system, and the access controller.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
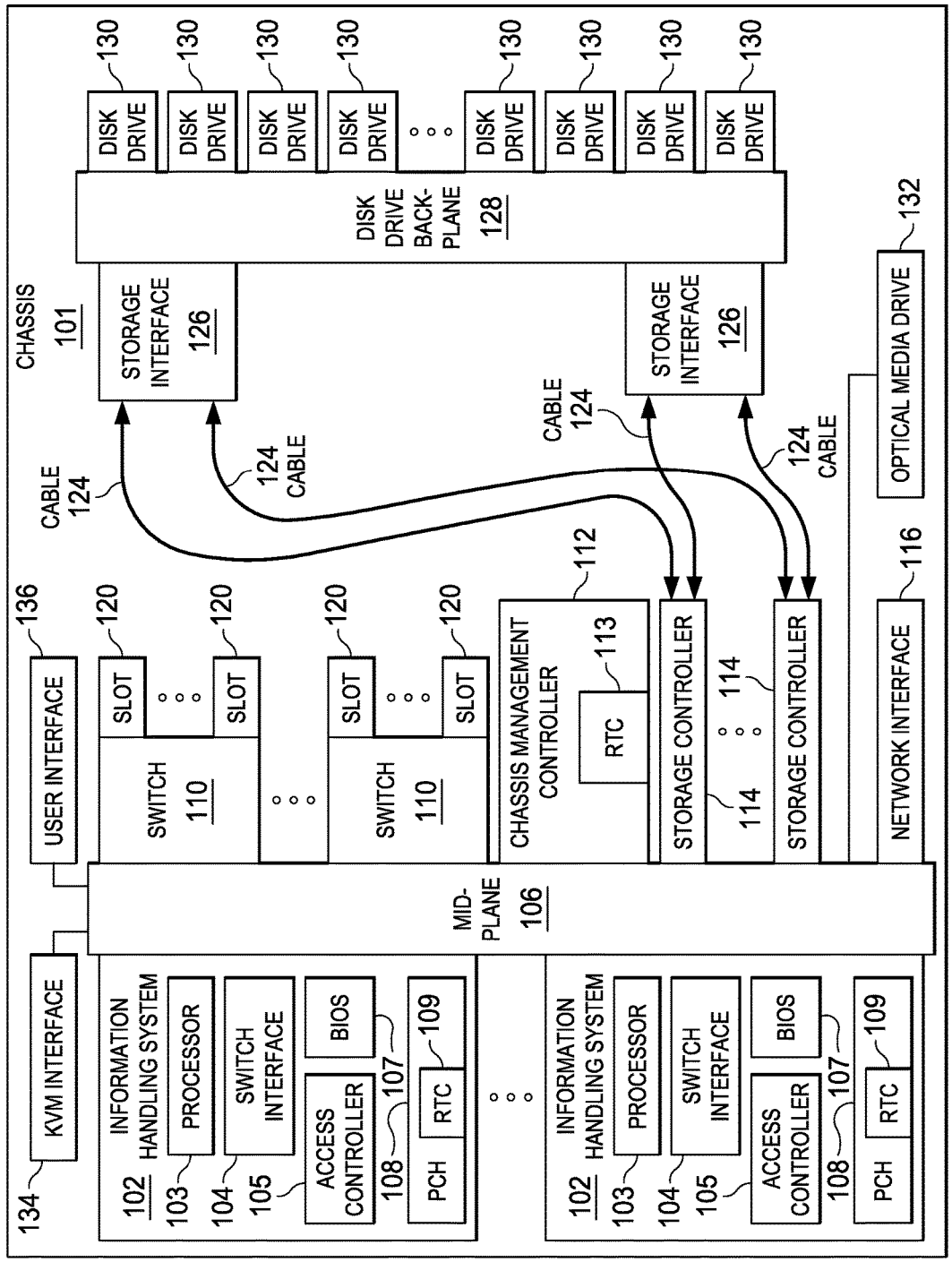
FIG. 1 illustrates a block diagram of an example system chassis with multiple information handling systems and with various peripheral and I/O capabilities common to the chassis as a whole, in accordance with embodiments of the present disclosure.
Figure 2:
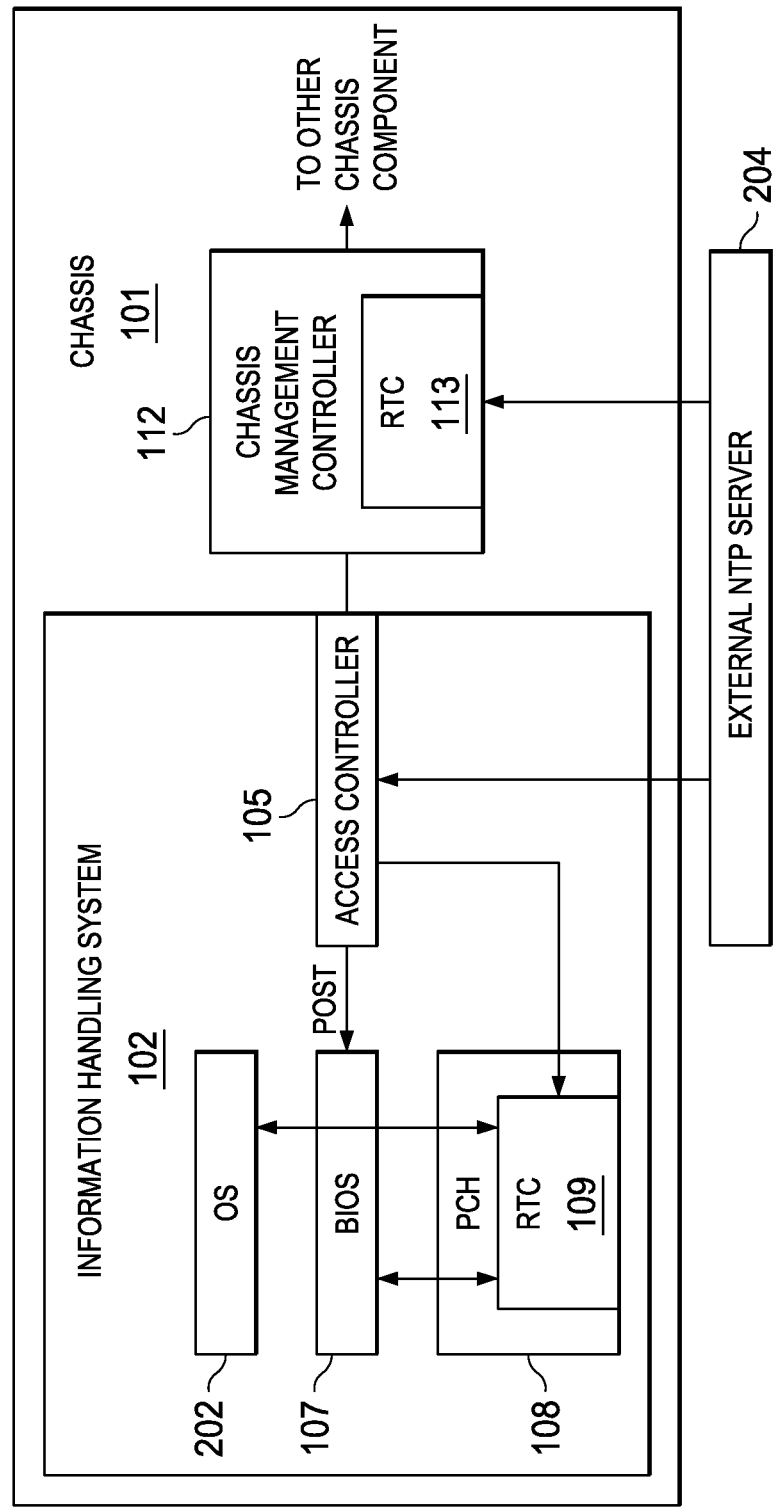
FIG. 2 illustrates a more detailed block diagram of an example system configured for distributing and synchronizing real-time clocks among various components of the system, in accordance with embodiments of the present disclosure.

Preferred embodiments and their advantages are best understood by reference to FIGS. 1 and 2, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

Information handling systems often use an array of physical storage resources (e.g., disk drives), such as a Redundant Array of Independent Disks ("RAID"), for example, for storing information. Arrays of physical storage resources typically utilize multiple disks to perform input and output operations and can be structured to provide redundancy which may increase fault tolerance. Other advantages of arrays of physical storage resources may be increased data integrity, throughput and/or capacity. In operation, one or more physical storage resources disposed in an array of physical storage resources may appear to an operating system as a single logical storage unit or "logical unit." Implementations of physical storage resource arrays can range from a few physical storage resources disposed in a chassis, to hundreds of physical storage resources disposed in one or more separate storage enclosures.

FIG. 1 illustrates a block diagram of an example system 100 having a chassis 101 with multiple information handling systems 102 and with various peripheral and I/O capabilities common to chassis 101 as a whole, in accordance with embodiments of the present disclosure. As depicted in FIG. 1, system 100 may comprise a chassis 101 including a plurality of information handling systems 102, a mid-plane 106, one or more switches 110, one or more chassis management controllers 112, a network interface 116, one or more slots 120, one or more cables 124, one or more storage interfaces 126, a disk drive backplane 128, a plurality of disk drives 130, an optical media drive 132, a keyboard-video-mouse ("KVM") interface 134, and a user interface 136.

An information handling system 102 may generally be operable to receive data from and/or communicate data to one or more disk drives 130 and/or other information handling resources of chassis 101 via mid-plane 106 and/or switches 110. In certain embodiments, an information handling system 102 may be a server. In such embodiments, an information handling system may comprise a blade server having modular physical design. In these and other embodiments, an information handling system 102 may comprise an M class server. As depicted in FIG. 1, an information handling system 102 may include a processor 103, one or more switch interfaces 104 communicatively coupled to processor 103, an access controller 105 communicatively coupled to processor 103, a basic input/output system (BIOS) 107 communicatively coupled to processor 103, and a platform controller hub (PCH) 108 communicatively coupled to processor 103, access controller 105, and BIOS 107.

A processor 103 may include any system, device, or apparatus configured to interpret and/or execute program instructions and/or process data, and may include, without limitation, a microprocessor, microcontroller, digital signal processor ("DSP"), application specific integrated circuit ("ASIC"), or any other digital or analog circuitry configured to interpret and/or execute program instructions and/or process data. In some embodiments, processor 103 may interpret and/or execute program instructions and/or process data stored in a memory, a disk drive 130, and/or another component of system 100.

A switch interface 104 may comprise any system, device, or apparatus configured to provide an interface between its associated information handling system 102 and switches 110. In some embodiments, switches 110 may comprise Peripheral Component Interconnect Express ("PCIe") switches, in which case a switch interface 104 may comprise a switch card configured to create a PCIe-compliant interface between its associated information handling system 102 and switches 110. In other embodiments, a switch interface 104 may comprise an interposer. Use of switch interfaces 104 in information handling systems 102 may allow for minimal changes to be made to traditional servers (e.g., M class servers) while supporting the overall system architecture disclosed herein. Although FIG. 1 depicts an implementation including a single switch interface 104 per information handling system 102, in some embodiments each information handling system 102 may include a plurality of switch interfaces 104 for redundancy, high availability, and/or other reasons.

An access controller 105 may be implemented by, for example, a microprocessor, microcontroller, DSP, ASIC, EEPROM, or any combination thereof. access controller 105 may be configured to communicate with one or more of chassis management controllers 112 via midplane 106 (e.g., via an Ethernet management fabric). access controller 105 may be configured to provide out-of-band management facilities for management of information handling system 102. Such management may be made by elements of chassis 101 even if information handling system 102 is powered off or powered to a standby state. access controller 105 may include a processor, memory, and network interface separate from the rest of information handling system 102. In certain embodiments, access controller 105 may include or may be an integral part of a baseboard management controller (BMC), Dell Remote Access Controller (DRAC) or an Integrated Dell Remote Access Controller (iDRAC).

A BIOS 107 may include any system, device, or apparatus configured to identify, test, and/or initialize information handling resources of an information handling system 102, and/or initialize interoperation of information handling system 102 with other information handling resources of chassis 101. "BIOS" may broadly refer to any system, device, or apparatus configured to perform such functionality, including without limitation, a Unified Extensible Firmware Interface (UEFI). In some embodiments, BIOS 107 may be implemented as a program of instructions that may be read by and executed on processor 103 to carry out the functionality of BIOS 107. In these and other embodiments, BIOS 107 may comprise boot firmware configured to be the first code executed by processor 103 when information handling system 102 is booted and/or powered on. As part of its initialization functionality, code for BIOS 107 may be configured to set components of information handling system 102 into a known state, so that one or more applications (e.g., an operating system or other application programs) stored on compatible media (e.g., disk drives 130) may be executed by processor 103 and given control of information handling system 102.

A PCH 108 may be any system, device, or apparatus configured to control certain data paths (e.g., data flow between the processor, memory and peripherals) and support certain functions of processor 103. A PCH 108 may also be known as a "chipset" of an information handling system 202. One such function may include real-time clock (RTC) 109. An RTC 109 may comprise any system, device, or apparatus that keeps track of the current time.

Mid-plane 106 may comprise any system, device, or apparatus configured to interconnect modular information handling systems 102 with information handling resources. Accordingly, mid-plane 106 may include slots and/or connectors configured to receive information handling systems 102, switches 110, chassis management controllers 112, storage controllers 114, network interface 116, optical media drive 132, KVM interface 134, user interface 136, and/or other information handling resources. In one embodiment, mid-plane 106 may include a single board configured to interconnect modular information handling systems 102 with information handling resources. In another embodiment, mid-plane 106 may include multiple boards configured to interconnect modular information handling systems 102 with information handling resources. In yet another embodiment, mid-plane 106 may include cabling configured to interconnect modular information handling systems 102 with information handling resources.

A switch 110 may comprise any system, device, or apparatus configured to couple information handling systems 102 to storage controllers 114 (e.g., via mid-plane 106) and slots 120 and perform switching between information handling systems 102 and various information handling resources of system 100, including storage controllers 114 and slots 120. In certain embodiments, a switch 110 may comprise a PCIe switch. In other embodiments, a switch may comprise a generalized PC bus switch, an Infiniband switch, or other suitable switch. As shown in FIG. 1, chassis 101 may include a plurality of switches 110. In such embodiments, switches 110 may operate in a redundant mode for shared devices (e.g., storage controllers 114 and/or devices coupled to slots 120) and in a non-redundant mode for non-shared/zoned devices. As used herein, shared devices may refer to those which may be visible to more than one information handling system 102, while non-shared devices may refer to those which are visible to only a single information handling system 102. In some embodiments, mid-plane 106 may include a single switch 110.

A chassis management controller 112 may be any system, device, or apparatus configured to facilitate management and/or control of system 100, its information handling systems 102, and/or one or more of its component information handling resources. A chassis management controller 112 may be configured to issue commands and/or other signals to manage and/or control information handling system 102 and/or information handling resources of system 100. A chassis management controller 112 may comprise a microprocessor, microcontroller, DSP, ASIC, field programmable gate array ("FPGA"), EEPROM, or any combination thereof. As shown in FIG. 1, a chassis management controller 112 may be coupled to mid-plane 106. Although only one chassis management controller is shown in FIG. 1, in some embodiments system 100 may include a plurality of chassis management controllers 112, and in such embodiments, chassis management controllers 112 may be configured as redundant. In some embodiments, a chassis management controller 112 may provide a user interface and high level controls for management of switches 110, including configuring assignments of individual information handling systems 102 to non-shared information handling resources of system 100. In these and other embodiments, a chassis management controller may define configurations of the storage subsystem (e.g., storage controllers 114, storage interfaces 126, disk drives 130, etc.) of system 100. For example, a chassis management controller 112 may provide physical function configuration and status information that would normally occur at the driver level in traditional server implementations. Examples of physical functions include disk drive discovery and status, RAID configuration and logical volume mapping.

In addition or alternatively, a chassis management controller 112 may also provide a management console for user/administrator access to these functions. For example, a chassis management controller 112 may implement Web Services Management ("WS-MAN") or another suitable management protocol permitting a user to remotely access a chassis management controller 112 to configure system 100 and its various information handling resources. In such embodiments, a chassis management controller 112 may interface with a network interface separate from network interface 116, thus allowing for "out-of-band" control of system 100, such that communications to and from chassis management controller 112 are communicated via a management channel physically isolated from an "in band" communication channel with network interface 116. Thus, for example, if a failure occurs in system 100 that prevents an administrator from interfacing with system 100 via network interface 116 and/or user interface 136 (e.g., operating system failure, power failure, etc.), the administrator may still be able to monitor and/or manage system 100 (e.g., to diagnose problems that may have caused failure) via a chassis management controller 112. In the same or alternative embodiments, chassis management controller 112 may allow an administrator to remotely manage one or more parameters associated with operation of system 100 and its various information handling resources (e.g., power usage, processor allocation, memory allocation, security privileges, etc.).

In these and other embodiments, a chassis management controller 112 may be coupled to access controllers 105 of information handling systems 102. For example, in such embodiments, network interfaces of access controllers 105 may be able to communicate with a chassis management controller 112 via a communication network (e.g., an Ethernet fabric) internal to chassis 101.

In addition, chassis management controller 112 may include a real-time clock (RTC) 113. An RTC 113 may comprise any system, device, or apparatus that keeps track of the current time, and may be similar in structure and function to an RTC 109 present in an information handling system 102.

Although FIG. 1 depicts chassis 101 as having a single chassis management controller 112, chassis 101 may include any suitable number of chassis management controllers 112.

A storage controller 114 may include any system, apparatus, or device operable to manage the communication of data between one or more of information handling systems 102 and one or more of disk drives 130. In certain embodiments, a storage controller 114 may provide functionality including, without limitation, disk aggregation and redundancy (e.g., RAID), I/O routing, and error detection and recovery. As shown in FIG. 1, a storage controller 114 may be coupled to a connector on a switch 110. Also as shown in FIG. 1, system 100 may include a plurality of storage controllers 114, and in such embodiments, storage controllers 114 may be configured as redundant. In addition or in the alternative, storage controllers 114 may in some embodiments be shared among two or more information handling systems 102. As also shown in FIG. 1, each storage controller 114 may be coupled to one or more storage interfaces 126 via cables 124. For example, in some embodiments, each storage controller 114 may be coupled to a single associated storage interface 126 via a cable 124. In other embodiments, each storage controller 114 may be coupled to two or more storage interfaces 126 via a plurality of cables 124, thus permitting redundancy as shown in FIG. 1. Storage controllers 114 may also have features supporting shared storage and high availability. For example, in PCIe implementations, a unique PCIe identifier may be used to indicate shared storage capability and compatibility in system 100.

As depicted in FIG. 1, switch 110 may have coupled thereto one or more slots 120. A slot 120 may include any system, device, or apparatus configured to allow addition of one or more expansion cards to chassis 101 in order to electrically couple such expansion cards to a switch 110. Such slots 120 may comprise any suitable combination of full-height risers, full-height slots, and low-profile slots. A full-height riser may include any system, device, or apparatus configured to allow addition of one or more expansion cards (e.g., a full-height slot) having a physical profile or form factor with dimensions that practically prevent such expansion cards to be coupled in a particular manner (e.g., perpendicularly) to mid-plane 106 and/or switch 110 (e.g., the proximity of information handling resources in chassis 101 prevents physical placement of an expansion card in such a manner). Accordingly, a full-height riser may itself physically couple with a low profile to mid-plane 106, a switch 110, or another component, and full-height cards may then be coupled to full-height slots of a full-height riser. On the other hand, low-profile slots may be configured to couple low-profile expansion cards to switches 110 without the need for a full-height riser.

Slots 120 may also include electrically conductive elements (e.g., edge connectors, traces, etc.) allowing for expansion cards inserted into slots 120 to be electrically coupled to switches 110. In operation, switches 110 may manage switching of communications between individual information handling systems 102 and expansion cards coupled to slots 120. In some embodiments, slots 120 may be nonshared (e.g., each slot 120 is associated with a single information handling system 102). In other embodiments, one or more of slots 120 may be shared among two or more information handling systems 102. In these and other embodiments, one or more slots 120 may be configured to be compatible with PCIe, generalized PC bus switch, Infiniband, or another suitable communication specification, standard, or protocol.

Network interface 116 may include any suitable system, apparatus, or device operable to serve as an interface between chassis 101 and an external network (e.g., a local area network or other network). Network interface 116 may enable information handling systems 102 to communicate with the external network using any suitable transmission protocol (e.g., TCP/IP) and/or standard (e.g., IEEE 802.11, Wi-Fi). In certain embodiments, network interface 116 may include a network interface card ("NIC"). In the same or alternative embodiments, network interface 116 may be configured to communicate via wireless transmissions. In the same or alternative embodiments, network interface 116 may provide physical access to a networking medium and/or provide a low-level addressing system (e.g., through the use of Media Access Control addresses). In some embodiments, network interface 116 may be implemented as a local area network ("LAN") on motherboard ("LOM") interface.

In some embodiments, various components of chassis 101 may be coupled to a planar. For example, a planar may interconnect switches 110, chassis management controller 112, storage controllers 114, network interface 116, optical media drive 132, KVM interface 134, user interface 136, and/or other modular information handling resources of chassis 101 to mid-plane 106 of system 100. Accordingly, such planar may include slots and/or connectors configured to interconnect with such information handling resources.

Storage interfaces 126 may include any system, device, or apparatus configured to facilitate communication between storage controllers 114 and disk drives 130. For example, a storage interface may serve to permit a relatively small number of communication links (e.g., two) between storage controllers 114 and storage interfaces 126 to communicate with a greater number (e.g., 25) of disk drives 130. Thus, a storage interface 126 may provide a switching mechanism and/or disk drive addressing mechanism that allows an information handling system 102 to communicate with numerous disk drives 130 via a limited number of communication links and/or channels. Accordingly, a storage interface 126 may operate like an Ethernet hub or network switch that allows multiple systems to be coupled using a single switch port (or relatively few switch ports). A storage interface 126 may be implemented as an expander (e.g., a Serial Attached SCSI ("SAS") expander), an Ethernet switch, a FibreChannel switch, Internet Small Computer System Interface (iSCSI) switch, or any other suitable switch. In order to support high availability storage, system 100 may implement a plurality of redundant storage interfaces 126, as shown in FIG. 1.

Disk drive backplane 128 may comprise any system, device, or apparatus configured to interconnect modular storage interfaces 126 with modular disk drives 130. Accordingly, disk drive backplane 128 may include slots and/or connectors configured to receive storage interfaces 126 and/or disk drives 130. In some embodiments, system 100 may include two or more backplanes, in order to support differently-sized disk drive form factors. To support redundancy and high availability, a disk drive backplane 128 may be configured to receive a plurality (e.g., 2) of storage interfaces 126 which couple two storage controllers 114 to each disk drive 130.

Each disk drive 130 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although disk drives 130 are depicted as being internal to chassis 101 in FIG. 1, in some embodiments, one or more disk drives may be located external to chassis 101 (e.g., in one or more enclosures external to chassis 101).

Optical media drive 132 may be coupled to mid-plane 106 and may include any suitable system, apparatus, or device configured to read data from and/or write data to an optical storage medium (e.g., a compact disc, digital versatile disc, blue laser medium, and/or other optical medium). In certain embodiments, optical media drive 132 may use laser light or other electromagnetic energy to read and/or write data to an optical storage medium. In some embodiments, optical media drive 132 may be nonshared and may be user-configurable such that optical media drive 132 is associated with a single information handling system 102.

KVM interface 134 may be coupled to mid-plane 106 and may include any suitable system, apparatus, or device configured to couple to one or more of a keyboard, video display, and mouse and act as a switch between multiple information handling systems 102 and the keyboard, video display, and/or mouse, thus allowing a user to interface with a plurality of information handling systems 102 via a single keyboard, video display, and/or mouse.

User interface 136 may include any system, apparatus, or device via which a user may interact with system 100 and its various information handling resources by facilitating input from a user allowing the user to manipulate system 100 and output to a user allowing system 100 to indicate effects of the user's manipulation. For example, user interface 136 may include a display suitable for creating graphic images and/or alphanumeric characters recognizable to a user, and may include, for example, a liquid crystal display, cathode ray tube, a plasma screen, and/or a digital light processor projection monitor. In certain embodiments, such a display may be an integral part of chassis 101 and receive power from power supplies (not explicitly shown) of chassis 101, rather than being coupled to chassis 101 via a cable. In some embodiments, such display may comprise a touch screen device capable of receiving user input, wherein a touch sensor may be mechanically coupled or overlaid upon the display and may comprise any system, apparatus, or device suitable for detecting the presence and/or location of a tactile touch, including, for example, a resistive sensor, capacitive sensor, surface acoustic wave sensor, projected capacitance sensor, infrared sensor, strain gauge sensor, optical imaging sensor, dispersive signal technology sensor, and/or acoustic pulse recognition sensor. In these and other embodiments, user interface 136 may include other user interface elements (e.g., a keypad, buttons, and/or switches placed in proximity to a display) allowing a user to provide input to system 100. User interface 136 may be coupled to chassis management controllers 112 and/or other components of system 100, and thus may allow a user to configure various information handling resources of system 100 (e.g., assign individual information handling systems 102 to particular information handling resources).

When a system (e.g., system 100) is architected so as to allow information handling resources (e.g., PCIe adapters coupled to slots 120) to be located in a chassis having shared resources such that the information handling resources may be assigned to one information handling system or shared among a plurality of information handling resources, challenges may arise when needing to service an information handling resource.

Shared resources or devices, such as PCIe adapters coupled to slots 120, may be virtualized across multiple information handling systems 102. Non-shared resources or devices may be partitioned such that they are visible only to a single information handling system 102 at a time. Chassis management controller 112 may be configured to handle routing and switching through switches 110 to affect sharing of a resource to multiple information handling systems 102 or to affect dedicated assignment of a resource to a single information handling system 102.

FIG. 2 illustrates a more detailed block diagram of an example system 100 configured for distributing and synchronizing real-time clocks among various components of system 100, in accordance with embodiments of the present disclosure. As shown in FIG. 2, an operating system (OS) 202 may execute on a processor 103 of an information handling system 102 after being read by such processor 103.

In operation, during power-on/self-test (POST) of a BIOS 107 executing on an information handling system 102, BIOS 107 may read real time from an access controller 105 of the information handling system 102, and write the real time to RTC 109 of the information handling system. At times other than POST a BIOS 107 may get real time by reading real time from RTC 109 of the information handling system 102. Furthermore, BIOS 107 may not include an option within its BIOS setup to change time of RTC 109.

An OS 202 executing on an information handling system 102 may get real time by reading real time from RTC 109 of the information handling system 102. If a user desires to change the time set in RTC 109, such user may interact with OS 202 to change the time, and OS 202 may, in response, set time in RTC 109 to the time selected by the user.

As for an access controller 105 of an information handling system 102, an access controller may execute a Network Time Protocol (NTP) client and either retrieve time via its network interface from an NTP server external to system 100 or from an NTP server executing internally to chassis management controller 112. In addition, access controller 105 may poll RTC 109 of the information handling system to determine if a user has made real time changes via OS 202, and may use a time retrieved from RTC 109 in such a case. In addition, as opposed to existing approaches in which a time for access controller 105 is set by BIOS 107, BIOS 107 may instead not be capable of directly setting time within access controller 105. At times other than POST, an access controller 105 of an information handling system 102 may write time to RTC 109 of such information handling system 102 via a sideband interface (e.g., management engine) of PCH 108. Thus, from the perspective of an individual information handling system 102, its access controller 105 is its center of truth when it comes to determining real time, unless overridden by a user time setting.

As for chassis management controller 112, it may get real time by either retrieving real time from RTC 113 of such chassis management controller 112 (e.g., which RTC may be backed by a coin-cell battery) or by internally executing an NTP client and retrieving real time via its network interface from an NTP server 204 external to system 100.

In order to synchronize time to other components of chassis 101, chassis management controller 112 may execute an internal NTP server and distribute real time to such components or to an access controller 105 of an individual information handling system 102, as described above.

The methods and systems described above also facilitate efficient handling for when one or more information handling systems in chassis 101 are configured for different time zones, as it allows an access controller 105 of an information handling system 102 to synchronize user-intended real time skews or individual information handling system 102 time zone assignments with the RTC 109 of the information handling system 102 during power cycles, reboots, blade resets, or slot migrations. Information regarding user-intended real time skews or time zone assignments may be set and/or stored in a BIOS 107 or RTC 109 of an information handling system 102.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system, comprising:
    a processor;
    an access controller communicatively coupled to the processor and configured to execute, prior to completion of a power-on/self-test of the information handling system, a client for retrieving real time via a network communicatively coupled to the access controller;
    a real-time clock communicatively coupled to the access controller; and
    a basic input/output system embodied in one or more instructions readable and executable by the processor and configured to, prior to the completion of the power-on/self-test of the information handling system:
        read the real time from the access controller; and
        write the real time to the real-time clock.

2. The information handling system of claim 1, the access controller further configured to:
    poll the real-time clock to determine if a user of the information handling system has set the real time present in the real-time clock; and
    retrieve the real time from the real-time clock in response to a determination that the user has set the real time present in the real-time clock.

3. The information handling system of claim 1, the real-time clock further configured to receive user-initiated changes to the real time from an operating system executing on the processor.

4. The information handling system of claim 1, wherein the real-time clock is integral to a chipset communicatively coupled to the processor and the access controller.

5. The information handling system of claim 1, wherein the access controller is configured to retrieve the real time from a chassis management controller integral to a chassis housing the information handling system.

6. The information handling system of claim 1, wherein the access controller is configured to retrieve the real time from a server external to a chassis housing the information handling system.

7. The information handling system of claim 1, the access controller configured to write the real time to the real-time clock.

8. The information handling system of claim 7, wherein the real-time clock is integral to a chipset communicatively coupled to the processor and the access controller and the access controller is configured to write the real time to the real-time clock via a sideband interface of the chipset.

9. The information handling system of claim 7, wherein the access controller is configured to write the real time to the real-time clock at times of operating other than the power-on/self-test of the information handling system.

10. A method comprising:
    executing, by an access controller of an information handling system and prior to completion of a power-on/self-test of the information handling system, a client for retrieving real time via a network communicatively coupled to the access controller; and
    prior to the completion of the power-on/self-test of the information handling system:
        reading the real time from the access controller; and
        writing the real time to a real-time clock communicatively coupled to the processor and the access controller.

11. The method of claim 10, further comprising:
    polling, by the access controller, the real-time clock to determine if a user of the information handling system has set the real time present in the real-time clock; and
    retrieving, by the access controller, real time from the real-time clock in response to a determination that the user has set the real time present in the real-time clock.

12. The method of claim 10, further comprising receiving, by the real-time clock, user-initiated changes to the real time from an operating system executing on the processor.

13. The method of claim 10, wherein the real-time clock is integral to a chipset communicatively coupled to the processor and the access controller.

14. The method of claim 10, wherein retrieving the real time comprises retrieving the real time from a chassis management controller integral to a chassis housing an information handling system comprising the access controller.

15. The method of claim 10, wherein retrieving the real time comprises retrieving the real time from a server external to a chassis housing the information handling system.

16. The method of claim 10, further comprising writing, by the access controller, the real time to the real-time clock.

17. The method of claim 16, wherein the real-time clock is integral to a chipset communicatively coupled to the processor and the access controller, and writing the real time to the real time clock comprises writing the real time via a sideband interface of the chipset.

18. The method of claim 16, wherein writing the real time to the real time clock comprises writing the real time to the real-time clock at times of operating other than during the power-on/self-test of the information handling system.

* * * * *